(No Model.)
J. PATERSON.
INSTRUMENT FOR TESTING THE FAIRNESS OF STEAM ENGINE CRANK SHAFTS.
No. 377,115. Patented Jan. 31, 1888.
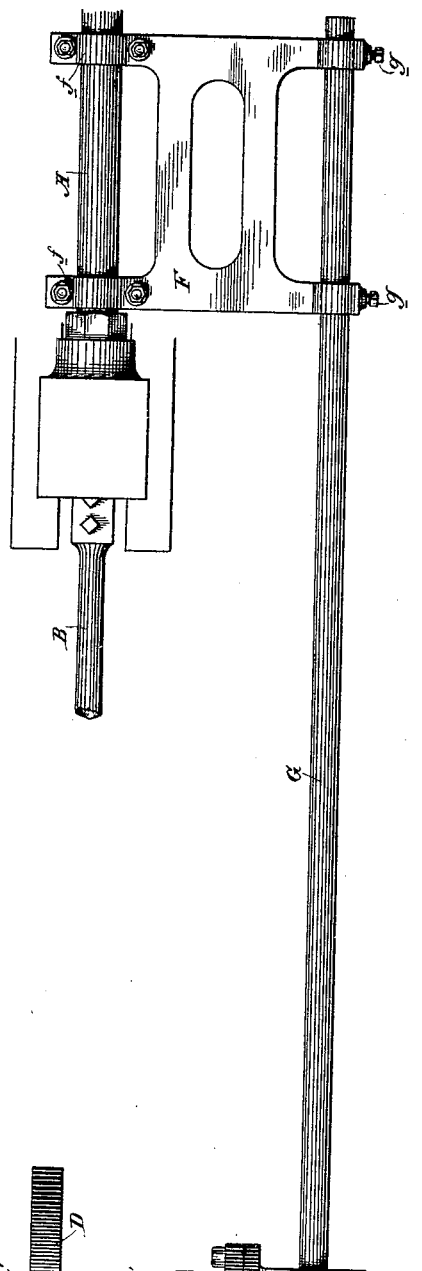
Fig. 1.
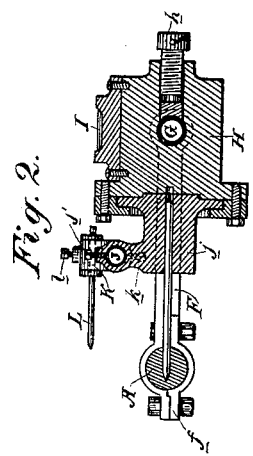
Fig. 2.
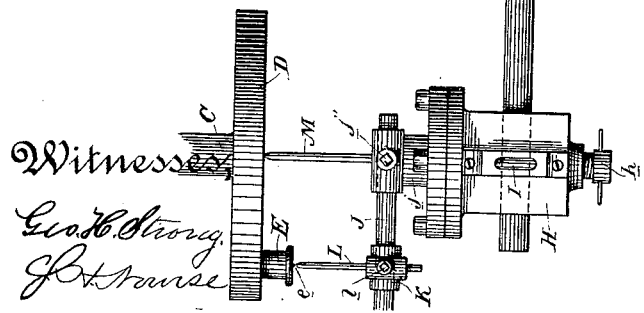
Witnesses
Geo. H. Strong.
Inventor,
John Paterson
By Dewey & Co.
attys

United States Patent Office.

JOHN PATERSON, OF SAN FRANCISCO, CALIFORNIA.

INSTRUMENT FOR TESTING THE FAIRNESS OF STEAM-ENGINE CRANK-SHAFTS.

SPECIFICATION forming part of Letters Patent No. 377,115, dated January 31, 1888.

Application filed August 31, 1887. Serial No. 248,415. (No model.)

*To all whom it may concern:*

Be it known that I, JOHN PATERSON, of the city and county of San Francisco, and State of California, have invented an Improvement in Instruments for Testing the Fairness of Steam-Engine Crank-Shafts; and I hereby declare the following to be a full, clear, and exact description thereof.

My invention relates to the class of instruments used upon steam-engines to gage or test their several parts or their operation; and my invention has for its object the placing in the hands of engineers, engine-builders, and others having valuable steam-engines in charge a correct and speedy method of testing the fairness and adjusting the crank-shafts of steam-engines.

My invention consists in a pointer supported by and movable upon a rod or bar which is secured by a frame to the piston-rod of the engine and held parallel therewith in the same horizontal plane, said pointer being adapted to be centered on the crank-shaft, and a second pointer adapted to be centered on the crank-pin and to be moved about the first pointer as a center, whereby the crank-throw may be tested at all points and the fairness of the shaft determined.

My invention further consists in details of construction and adjustment, all of which I shall hereinafter fully describe by reference to the accompanying drawings, in which—

Figure 1 is a plan of the instrument, showing it in position. Fig. 2 is a cross-section through sliding head H and connected parts.

A is the piston-rod of the engine. B is the connecting-rod. C is the crank-shaft. D is the crank, and E is the crank-pin.

F is a frame, preferably of brass, and connected at *f f* with the working part of the piston-rod A.

G is a rod, bar, or tube, (preferably the latter, for the sake of lightness,) which is fitted in the other end of the frame F in sockets therein, so that it may be adjusted lengthwise, it being fixed in the position to which it is adjusted by the set-screws *g*.

The rod G lies in the same horizontal plane as the piston-rod and extends a few inches beyond the center of the crank-shaft, forming, practically, a perfectly parallel extension of the piston-rod A. On the end of the rod G next the shaft is carried the sliding adjustable head H, adapted to be set in position by a screw, *h*, and fitted on the top side with a small level, I. In the end of head H and next to the shaft is fitted and adapted to rotate the hub *j*, in which is fitted the radial arm or tube J, which is adjustable lengthwise, and is set by a screw, *j'*. The outer end of this arm carries a sliding head, K, adapted to be set by a screw, *k*, and having fitted to it adjustably a pointer, L, set by a screw, *l*.

A pointer, M, is fitted in the end of the hub *j* of arm J, and is adapted to move endwise therein, said last-named pointer being for the purpose of setting the instrument, in order that the pointer L may revolve concentric with the path of the crank-pin.

If the outside of the crank-pin is flat or has been bruised, it will be necessary to drill a small hole in the center and put in a pin, (represented here by *e*,) allowing it to project about one-eighth of an inch.

To use the instrument, first disconnect the connecting-rod from the crank-pin, leaving the cross-head about one inch from its extreme outward travel. After setting the head H perfectly level, by means of the level in its top, center the pointer M on the crank-shaft C. Then turn the crank-shaft around and adjust the pointer L to the center of its crank-pin. Then gage said pin at the outward and inward centers of the crank-throw by the pointer L. It will thus be readily perceived whether the shaft is rectangular with the line of the cylinder. Then turn the crank-pin to the top and then to the bottom, following with the pointer L, which will show at once whether the shaft is level or not.

The application of this instrument will show the slightest variation of the shaft from the rectangular path of the piston's travel, and at the same time point out the slightest variation of the shaft from a true level. This it will accomplish in a few minutes without the labor and great loss of time required to take out the piston, center the cylinder, apply a line and a level, as is usually done, involving a heavy loss—as, for example, in the case of large engines used in driving the machinery of factories and mines.

The advantages resulting from the use of this instrument are the absence of hot bearings, saving of brasses and oil, increase of power, as well as reducing to a minimum the risk of breaking shafts and crank-pins, with the accompanying wreckage resulting therefrom.

In situations where a number of steam-engines are under one ownership or control only one instrument will be required. Being made for the largest engine, it is only necessary to have bushings bored and in halves to fit the various sizes of piston-rods and turned outside to fit the frame, while any convenient length of tube may be used, as well as a number of pointers of various lengths.

In order to test the instrument at any time it is only necessary to turn the radial arm around against a plumb-line to test the level and against the largest tube to test the other two points.

Having thus described my invention, what I claim as new, and desire to secure by Letters Patent, is—

1. An instrument for testing the fairness of crank-shafts of steam-engines, consisting of a frame-work to be secured to the piston-rod, a pointer carried by the frame-work for centering on the crank-shaft, and a second pointer movable about the first as a center for centering on the crank-pin, substantially as described.

2. An instrument for testing the fairness of crank-shafts of steam-engines, consisting of a frame-work to be secured to the piston-rod, a level on said frame-work for leveling it, a pointer carried by the frame-work for centering on the crank-shaft, and a second pointer movable about the first as a center for centering on the crank-pin, substantially as described.

3. An instrument for testing the fairness of crank-shafts of steam-engines, consisting of a frame to be secured to the piston-rod, a rod secured to the frame-work and extending parallel with the piston-rod, a pointer carried by the rod for centering on the crank-shaft, and a second pointer movable about the first as a center for centering on the crank-pin, substantially as described.

4. An instrument for testing the fairness of crank-shafts of steam-engines, consisting of a frame to be secured to the piston-rod, a rod extending from the frame in the horizontal plane of and parallel with the piston-rod, a level on the frame-rod, a pointer carried by said rod for centering on the crank-shaft, and a second pointer movable about the first as a center for centering on the crank-pin, substantially as described.

5. An instrument for testing the fairness of crank-shafts of steam-engines, consisting of a frame to be secured to the piston-rod, a rod extending from the frame in the horizontal plane of and parallel with the piston-rod, a sliding head adjustable on said frame-rod, a pointer carried by said head for centering on the crank-shaft, and a second pointer movable about the first as a center for centering on the crank-pin, substantially as described.

6. An instrument for testing the fairness of crank-shafts of steam-engines, consisting of a frame to be secured to the piston-rod, a rod extending from the frame in the horizontal plane of and parallel with the piston-rod, a sliding head adjustable on the frame-rod, a hub rotating in said head, a pointer carried by the hub for centering on the crank-shaft, a radial arm carried by said hub, a sliding head adjustable on the arm, and a pointer carried by said last-named head for centering on the crank-pin, substantially as described.

7. An instrument for testing the fairness of crank-shafts of steam-engines, consisting of a frame to be secured to the piston-rod, a rod fitted to the frame and adjustable lengthwise therein, said rod extending in the horizontal plane of and parallel to the piston-rod, a sliding head adjustable on said frame-rod, a hub fitted to and rotating on the sliding head, a pointer carried by the hub for centering on the crank-shaft, a radial arm carried by said hub, a sliding head adjustable on said arm, and a pointer carried by said last-named head for centering on the crank-pin, substantially as described.

8. An instrument for testing the fairness of crank-shafts of steam engines, consisting of a frame to be secured to the piston-rod, a longitudinally-adjustable rod carried by the frame and extending in the horizontal plane of and parallel with the piston-rod, a sliding head adjustable on the frame-rod, a level carried by said head, a rotating hub on the end of the head, an adjustable pointer in said hub for centering on the crank-shaft, a radial arm carried by the hub and adjustable lengthwise therein, a sliding head adjustable on the arm, and an adjustable pointer carried by the last-named head for centering on the crank-pin, substantially as described.

In witness whereof I have hereunto set my hand.

JOHN PATERSON.

Witnesses:
S. H. NOURSE,
H. C. LEE.